United States Patent [19]

Takahashi et al.

[11] Patent Number: 6,013,693
[45] Date of Patent: Jan. 11, 2000

[54] ULTRAVIOLET-CURABLE SILICONE-BASED RELEASING COMPOSITION

[75] Inventors: Masatoshi Takahashi; Shinji Irifune, both of Gunma-ken, Japan

[73] Assignee: Shin-Etsu Chemical Co., Ltd., Japan

[21] Appl. No.: 09/105,004

[22] Filed: Jun. 26, 1998

[30] Foreign Application Priority Data

Jun. 27, 1997 [JP] Japan .................................. 9-171392

[51] Int. Cl.$^7$ ........................................ C08F 2/46
[52] U.S. Cl. .......................... 522/99; 522/14; 522/148; 522/172
[58] Field of Search ............... 522/99, 148, 91, 522/172, 14

[56] References Cited

U.S. PATENT DOCUMENTS

| | | | |
|---|---|---|---|
| 4,201,808 | 5/1980 | Cully et al. | 428/40 |
| 4,849,461 | 7/1989 | Lee et al. | 522/33 |
| 5,432,208 | 7/1995 | Masuhara et al. | 522/99 |

*Primary Examiner*—James J. Seidleck
*Assistant Examiner*—Sanza L. McClendon
*Attorney, Agent, or Firm*—Millen, White, Zelano & Branigan, P.C.

[57] ABSTRACT

Provided by the invention is an ultraviolet-curable silicone-based releasing agent suitable for use as a coating agent on the back surface of a pressure-sensitive adhesive tape and releasable protective sheet on a pressure-sensitive adhesive label with an advantage that the coating layer thereof is curable by ultraviolet irradiation in an atmosphere which is not completely free from oxygen having an inhibiting effect on the curing reaction of the coating layer contributing to cost reduction for the production of pressure-sensitive adhesive tapes and labels. The releasing composition comprises, in addition to a radical-polymerizable organopolysiloxane having (meth)acryloxyalkyl groups and a photopolymerization initiator, a tertiary amine compound such as isoamyl 4-dimethylamino benzoate and 2-ethylhexyl 4-dimethylamino benzoate in a limited amount.

7 Claims, No Drawings

ULTRAVIOLET-CURABLE SILICONE-BASED RELEASING COMPOSITION

BACKGROUND OF THE INVENTION

The present invention relates to a novel ultraviolet-curable silicone-based releasing composition or, more particularly, to a silicone-based composition capable of giving, by irradiation with ultraviolet light, a cured coating film exhibiting excellent releasability from sticky adhesive surface to be suitable as a coating agent of the back surface of pressure-sensitive adhesive tapes, releasable protective backing sheet on pressure-sensitive adhesive labels and the like.

While several types of compositions are known in the prior art of the ultraviolet-curable silicone-based releasing compositions, the silicone compounds as the principal ingredient in most of these prior art releasing compositions have a molecular structure of an organopolysiloxane of which radical-reactive functional groups are introduced into the polysiloxane main chain. When such an organopolysiloxane is irradiated with ultraviolet light, free radicals generated from the functional groups promote the crosslinking reaction of the composition by the mechanism of a radical reaction. As an inherency of radical reactions in general, the crosslinking reaction proceeds very rapidly so that curing of the releasing layer can be completed within a short time to give very high productivity of the coating process for the production of pressure-sensitive adhesive tapes, releasable backing sheets of pressure-sensitive adhesive labels and the like to exhibit excellent releasing effect from a sticky adhesive surface.

In conducting curing of an ultraviolet-curable silicone-based composition of the above mentioned type by an irradiation treatment with ultraviolet light, one of the serious problems is that the oxygen molecules in the atmospheric air exhibit an inhibiting effect on the radical reaction sometimes resulting in incomplete curing of the releasing coating film. Although this problem can of course be solved by flashing the chamber for the ultraviolet irradiation with nitrogen gas to exclude the atmospheric oxygen as completely as possible, such a measure is economically not feasible due to the costs for the nitrogen gas consumed in large volumes and the requirement for an expensive air-tight sealing mechanism of the chamber for the ultraviolet irradiation treatment. Accordingly, it is eagerly desired to develop a novel ultraviolet-curable silicone-based releasing composition which is less susceptible to the inhibiting effect of the atmospheric oxygen against the curing reaction so as to enable the ultraviolet irradiation treatment to be carried out even under a relatively high partial pressure of oxygen with a great cost reduction.

SUMMARY OF THE INVENTION

The present invention accordingly has an object to provide a novel and improved ultraviolet-curable silicone-based releasing composition capable of being completely cured by the irradiation with ultraviolet light even under a relatively high oxygen partial pressure so that releasing coating films of the composition can be formed with a remarkably decreased consumption of nitrogen gas. The present invention has been completed on the base of an unexpected discovery that the above mentioned object can be accomplished by admixing a silicone-based releasing composition of a radical-polymerizable organopolysiloxane with a small amount of a specific tertiary amine compound.

Thus, the ultraviolet-curable silicone-based releasing composition provided by the present invention comprises, as a uniform mixture (A) 100 parts by weight of an organopolysiloxane having, in a molecule, at least two functional groups capable of polymerizing by a radical reaction caused by an irradiation treatment with ultraviolet light;

(B) from 0.1 to 10 parts by weight of a tertiary amine compound; and (C) from 0.1 to 10 parts by weight of a photopolymerization initiator.

DETAILED DESCRIPTION OF THE PREFERRED EMBODIMENTS

As is described above, the most characteristic feature in the ultraviolet-curable silicone-based releasing composition of the invention is in the formulation of the composition with admixture of a specific tertiary amine compound as the component (B) in a specific amount relative to the organopolysiloxane as the component (A). The tertiary amine compound suitable in this case is preferably a N,N-dialkyl aniline compound represented by the general formula $$R^1{}_2N\text{-pPn-}R^3, \tag{I}$$

in which pPn is a 1,4-phenylene group, each $R^1$ is, independently from the other, an alkyl group having 1 to 8 carbon atoms, such as methyl and ethyl groups, and $R^3$ is an atom or a group, which is preferably electron-attractive, selected from the group consisting of a hydrogen atom, monovalent hydrocarbon groups forming an ether linkage such as $C_1$–$C_4$ alkoxy or phenoxy group, hydrocarbon groups such as alkyl groups, alkenyl groups and aryl groups, halogen atoms including atoms of chlorine, bromine and iodine, carbonyl-containing groups such as —CHO and $C_1$–$C_8$ alkylcarbonyl groups derived from a ketone compound or aldehyde compound, carboxyl-containing groups such as $C_1$–$C_8$ alkoxycarbonyl groups, sulfur-containing groups such as mercapto group —SH, sulfonic acid group —$SO_3H$ and ester group —$SO_3R$, R being a $C_1$–$C_8$ alkyl group, and nitrogen-containing groups such as cyano group —CN, nitro group —$NO_2$ amino group —$NH_2$ and $C_1$–$C_8$ alkyl-substituted amino groups, of which carbonyl- or carboxyl-forming groups, —CN, —$NO_2$, —$SO_3H$ and —$SO_3R$ are preferable.

The component (A) as the principal ingredient of the inventive silicone-based releasing composition is an ultraviolet-curable organopolysiloxane having, in a molecule, at least two radical polymerizable groups and represented by the general formula $$R^5\text{—SiR}^4{}_2\text{—O—}(\text{—SiR}^4R^5\text{—O—})_a\text{—}(\text{—SiR}^4Q\text{—O—})_c\text{—}(\text{—SiR}^4R^5\text{—O—})_d\text{—SiR}^4{}_2\text{—}R^5, \tag{II}$$

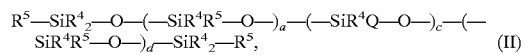

in which each $R^4$ is, independently from the others, a hydrogen atom, an alkyl group having 1 to 4 carbon atoms or a phenyl group, each $R^5$ has the same meaning as $R^1$ or is a (meth)acryloxyalkyl(oxy) group represented by the general formula $$\text{—}(\text{—O—})_p\text{—}C_nH_{2n}\text{—O—CO—CR}^6\text{=CH}_2, \tag{III}$$

$R^6$ being a hydrogen atom or a methyl group, the subscript n being an integer of 1, 2 or 3 and the subscript p being 0 or 1, with the proviso that from 3% to 30% by moles of the groups denoted by $R^5$ are the (meth)acryloxyalkyl(oxy) groups of the general formula (III), each of the subscripts a and d is a positive integer in the range from 10 to 200, the subscript c is 0, 1, 2 or 3 and Q is a substituted siloxy group represented by the general formula $$R^5\text{—SiR}^4{}_2\text{—}(\text{—O—SiR}^4R^5\text{—})_b\text{—O—}, \tag{IV}$$

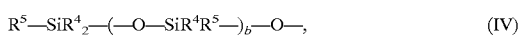

$R^4$ and $R^5$ each having the same meaning as defined above and the subscript b being a positive integer in the range from 10 to 200.

It is preferable that the above defined radical-polymerizable organopolysiloxane as the component (A) has at least two radical-polymerizable groups, i.e. the (meth) acryloxyalkyl(oxy) groups, of the general formula (III) in a molecule. Such a radical-polymerizable organopolysiloxane can be prepared by introducing the radical-polymerizable groups into a base organopolysiloxane according to a known method, for example, disclosed in Japanese Patent Publication 7-26146. The organopolysiloxane molecule may have a branched structure with trifunctional siloxane units corresponding to a value of the subscript c which is not 0. When the radical-polymerizable group is a (meth) acryloxyalkyloxy group with the subscript p in the general formula (III) equal to 1, in particular, such a radical-polymerizable organopolysiloxane can be synthesized by the dehydrogenation condensation reaction between a hydroxyalkyl (meth)acrylate and an organohydrogen polysiloxane having hydrogen atoms directly bonded to the silicon atoms.

The tertiary amine compound as the component (B) represented by the above given general formula (I) is exemplified by N,N-dialkyl aniline compounds such as N,N-dimethyl aniline and N,N-diethyl aniline as well as N,N-dialkyl aniline compounds having a substituent group on the 4-position of the phenyl group such as N,N-dimethyl p-toluidine, 4-tert-butyl N,N-dimethyl aniline, 4-(N,N-dimethylamino) phenol, 4-(N,N-dimethylamino) benzonitrile, 4-(N,N-dimethylamino) benzoic acid, 4-nitro-N,N-dimethyl aniline, N,N,N',N'-tetramethyl-1,4-phenylene diamine, ethyl 4-(N,N-dimethylamino) benzoate, isoamyl 4-(N,N-dimethylamino) benzoate, 2-ethylhexyl 4-(N,N-dimethylamino) benzoate and the like, of which isoamyl 4-(N,N-dimethylamino) benzoate and 2-ethylhexyl 4-(N,N-dimethylamino) benzoate are preferred in respect of the good miscibility with the organopolysiloxane as the component (A).

The amount of the tertiary amine compound in the inventive silicone-based composition is in the range from 0.1 to 10 parts by weight or, preferably, from 1 to 5 parts by weight per 100 parts by weight of the radical-polymerizable organopolysiloxane as the component (A) though dependent on various factors or, in particular, on the conditions of the coating works. For example, when the thickness of the coating film with the composition is around 1 $\mu$m, the amount of the tertiary amine compound is preferably in the range from 1 to 5 parts by weight per 100 parts by weight of the component (A). When the amount of the component (B) is too small, the desired improving effect cannot be fully obtained as a matter of course while, when the amount thereof is too large, disadvantages are caused that the coating films after curing of the composition sometimes suffer yellowing discoloration and the releasable coating films of the composition suffer a decrease in the adhesiveness retention of the adhesive surface contacted with the releasing surface film.

Though not particularly limitative, the photopolymerization initiator as the component (C) in the inventive silicone-based releasing composition is selected from acetophenone compounds of the bond-cleavage type exemplified by 2-hydroxy-2-methyl-1-phenyl propan-1-one, 1-(4-isopropylphenyl)-2-hydroxy-2-methyl propan-1-one, 1-hydroxycyclohexyl phenyl ketone, 2,2-dimethoxy-2-phenyl acetophenone, 2-methyl- [4-(methylthio)phenyl]-2-morpholino-1-propane, benzoyl diphenyl phosphine oxide, benzoin ether compounds exemplified by benzoin isopropyl ether and benzoin isobutyl ether and hydrogen-abstraction compounds exemplified by benzophenone, 2-isopropyl thioxanthone, 2-ethyl anthraquinone and the like.

The amount of the photopolymerization initiator as the component (C) in the inventive silicone-based composition is in the range from 0.1 to 10 parts by weight or, preferably, from 1 to 5 parts by weight per 100 parts by weight of the radical-polymerizable organopolysiloxane as the component (A). When the amount of the component (C) is too small, the curing reaction of the composition cannot proceed rapidly by the irradiation with ultraviolet light while, when the amount thereof is too large, a decrease is caused in the storage stability of the silicone-based composition.

It is of course optional according to need that the silicone-based releasing composition of the present invention is admixed with various kinds of known additives each in a limited amount. Examples of optional additives include reactive diluents, organic solvents, leveling agents, fillers, antistatic agents, defoaming agents, pigments, non-reactive organopolysiloxanes and the like. The amounts of addition of these optional additives, when added, are in the range from 5 to 50% by weight for the reactive diluents and organic solvents and in the range from 0.1 to 10% by weight for the other additives based on the total amount of the components (A), (B) and (C).

The silicone-based releasing composition of the present invention can be applied to the surface of a substrate of various kinds of materials including films and sheets of a plastic resin such as polyester resins, polypropylene, polyethylene, polyvinyl chloride, polytetrafluoroethylene, polyimide resins and the like, paper sheets such as glassine paper, kraft paper, clay-coated paper and the like and laminated paper sheets such as polyethylene-laminated paper and the like.

The coating method for coating these substrates with the inventive silicone-based releasing composition is not particularly limitattive but can be conventional including roller coating, gravure coating, wire doctor coating, air knife coating, dip coating and others. The coating amount with the inventive releasing composition is, though dependent on the particularly intended application of the coated products, usually in the range from 0.1 to 20.0 g/m² as calculated for the total amount of the components (A), (B) and (C).

After coating the substrate surface with the inventive silicone-based releasing composition, the coating layer is irradiated with ultraviolet light to effect curing of the coating layer to give a cured releasing film. The light source for the ultraviolet irradiation is not particularly limitative and can be selected from various ultraviolet lamps including mercury arc lamps, medium-pressure mercury lamps, high-pressure mercury lamps and the like. As to the irradiation dose, curing of the coating layer is complete, for example, by conducting irradiation for 0.1 to 10 seconds with a high-pressure mercury lamp of 2 kilowatts output to give a linear power density of 80 watts/cm at a distance of 8 cm from the irradiated surface.

In the following, the ultraviolet-curable silicone-based releasing composition of the invention is described in more detail by way of Examples and Comparative Examples, in which the term of "parts" always refers to "parts by weight". In the following Examples and Comparative Examples, evaluation of the releasing compositions was performed for the following items by the respective testing procedures described there.

(1) Curability of Coating Layer

A polyethylene-laminated paper sheet was uniformly coated with the ultraviolet-curable silicone-based releasing composition under testing in a coating amount of 1.0 g/m² as dried and the coating layer was irradiated in an irradiation chamber with ultraviolet light emitted from a high-pressure mercury lamp of 80 watts/cm linear power density at a distance of 8 cm under an atmosphere of a 98:2 by volume gaseous mixture of nitrogen and oxygen to record the minimum length of time in seconds for the irradiation by which the coating layer was cured to a tack-free condition by a finger touch test.

(2) Releasability

A polyethylene-laminated paper sheet was coated with the releasing composition and the coating layer was cured by ultraviolet irradiation in just the same manner as in the curability test (1) described above for an irradiation time corresponding to the minimum time determined in the curability test to prepare a test specimen which was subjected to aging at 25° C. for 20 hours. The cured coating layer of the thus obtained test specimen was coated with an acrylic resin-based pressure-sensitive adhesive of the solution type (Oribine BPS-8170, a product by Toyo Ink Co.) and, after a heat treatment at 100° C. for 3 minutes, a wood-free paper sheet of 64 g/m² basis weight was applied and bonded to the adhesive-coated surface followed by aging at 25° C. for 3 minutes. Thereafter, a strip of 5 cm width for a peeling test was prepared by cutting the sheet and a peeling test thereof was undertaken to peel off the paper sheet from the adhesive-coated surface by using a tensile tester at a peeling velocity of 300 mm/minute at a peeling angle of 180 degrees to determine the peeling resistance in g/5 cm.

(3) Adhesiveness Retention

A test specimen on a polyethylene-laminated paper sheet was prepared in just the same manner as in the peelability test (2) described above and a polyester film-based pressure-sensitive adhesive tape (No. 31 B, a product by Nitto Denko Co.) was applied and bonded to the cured coating layer of the test specimen after aging followed by a heat treatment at 70° C. for 20 hours under a load of 20 g/cm² and peeling of the adhesive tape from the test specimen. Thereafter, this adhesive tape was applied and bonded to a well polished stainless steel plate followed by peeling therefrom to determine the peeling resistance in g/2.5 cm. Separately, a fresh piece of the same pressure-sensitive adhesive tape was attached and bonded to a stainless steel plate followed by peeling to determine the peeling resistance in g/2.5 cm. Recording was made of the percentage of the peeling resistance for the adhesive tape taken from the releasing surface to the peeling resistance for the fresh adhesive tape.

EXAMPLE 1

An ultraviolet-curable silicone-based releasing composition was prepared by uniformly blending 100 parts of a radical-polymerizable acrylic-modified diorganopolysiloxane expressed by the formula

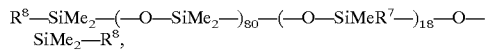

in which Me is a methyl group, $R^7$ is a 2-acryloxyethyl group and $R^8$ is a 3-acryloxypropyl group, 5 parts of 2-hydroxy-2-methyl-1-phenyl propan-1-one as a photopolymerization initiator (Darocure 1173, a product by Merck Co.) and 3 parts of isoamyl 4-dimethylamino benzoate. The thus prepared composition was subjected to the evaluation tests to give results of: curability of 0.34 second; peelability of 194 g/5 cm; and adhesiveness retention of 100%.

EXAMPLE 2

The formulation of the silicone-based releasing composition was the same as in Example 1 excepting for the replacement of the isoamyl 4-dimethylamino benzoate with the same amount of 2-ethylhexyl 4-dimethylamino benzoate. The results of the evaluation tests were: curability of 0.34 second; peelability of 300 g/5 cm; and adhesiveness retention of 103%.

COMPARATIVE EXAMPLE 1

The formulation of the silicone-based releasing composition was the same as in Example 1 excepting for the omission of the isoamyl 4-dimethylamino benzoate. The results of the evaluation tests were: curability of 1.2 seconds; peelability of 250 g/5 cm; and adhesiveness retention of 101%.

COMPARATIVE EXAMPLE 2

The formulation of the silicone-based releasing composition was the same as in Example 1 excepting for an increase in the amount of the isoamyl 4-dimethylamino benzoate from 3 parts to 15 parts. The results of the evaluation tests were: curability of 0.34 second; peelability of 204 g/5 cm; and adhesiveness retention of 20%.

What is claimed is:

1. An ultraviolet-curable silicone-based releasing composition which comprises, as a uniform mixture:

(A) 100 parts by weight of an organopolysiloxane having, in a molecule, at least two functional groups capable of polymerizing by a radical reaction;

(B) from 0.1 to 10 parts by weight of a tertiary amine compound comprising a N,N-dialkyl aniline compound represented by the general formula $R^1_2$N-pPn-$R^3$, in which each $R^1$ is, independently from the other, an alkyl group, pPn is a 1,4-phenylene group and $R^3$ is an atom or a group selected from the group consisting of a hydrogen atom, hydroxyl groups, ether groups, monovalent hydrocarbon groups, halogen atoms, carbonyl-containing groups, carboxyl-containing groups, nitrogen-containing groups, and sulfur containing groups; and (C) from 0.1 to 10 parts by weight of a photopolymerization initiator.

2. The ultraviolet-curable silicone-based releasing composition as claimed in claim 1 in which the organopolysiloxane as the component (A) is an organopolysiloxane represented by the general formula

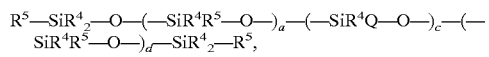

in which each $R^4$ is, independently from the others, a hydrogen atom, an alkyl group having 1 to 4 carbon atoms or a phenyl group, each $R^5$ is, independently from the others, the same as $R^1$ or a (meth)acryloxyalkyl(oxy) group represented by the general formula

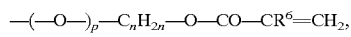

$R^6$ being a hydrogen atom or a methyl group, the subscript n being an integer of 1, 2 or 3 and the subscript p being 0 or 1, with the proviso that from 3% to 30% by moles of the groups denoted by $R^5$ are the (meth)acryloxyalkyl(oxy) groups, each of the subscripts a and d is a positive integer in the range from 10 to 200 and the subscript c is 0, 1, 2 or 3 and Q is a substituted siloxy group represented by the general formula

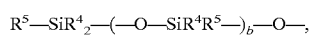

$R^4$ and $R^5$ each having the same meaning as defined above and the subscript b being a positive integer in the range from 10 to 200.

3. The ultraviolet-curable silicone-based releasing composition as claimed in claim 2 in which the alkyl group denoted by $R^1$ in the general formula representing the component (B) is a methyl group or ethyl group.

4. The ultraviolet-curable silicone-based releasing composition as claimed in claim 1 in which the tertiary amine compound as the component (B) is isoamyl 4-dimethylamino benzoate or 2-ethylhexyl 4-dimethylamino benzoate.

5. The ultraviolet-curable silicone-based releasing composition as claimed in claim 1 in which the amount of the tertiary amine compound as the component (B) is in the range from 1 to 5 parts by weight per 100 parts by weight of the component (A).

6. The ultraviolet-curable silicone-based releasing composition as claimed in claim 1 in which the amount of the photopolymerization initiator as the component (C) is in the range from 1 to 5 parts by weight per 100 parts by weight of the component (A).

7. The ultraviolet-curable silicone-based releasing composition as claimed in claim 1 in which the photopolymerization initiator as the component (C) is selected from the group consisting of 2-hydroxy-2-methyl-1-phenyl propan-1-one, 1-(4-isopropylphenyl)-2-hydroxy-2-methyl propan-1-one, 1-hydroxycyclohexyl phenyl ketone, 2,2-dimethoxy-2-phenyl acetophenone, 2-methyl-[4-(methylthio)phenyl]-2-morpholino-1-propane, benzoyl diphenyl phosphine oxide, benzoin isopropyl ether, benzoin isobutyl ether, benzophenone, 2-isopropyl thioxanthone and 2-ethyl anthraquinone.

* * * * *